March 24, 1964     J. H. SHEPLEY     3,126,069
BALER ATTACHMENT
Filed April 16, 1963     3 Sheets-Sheet 1
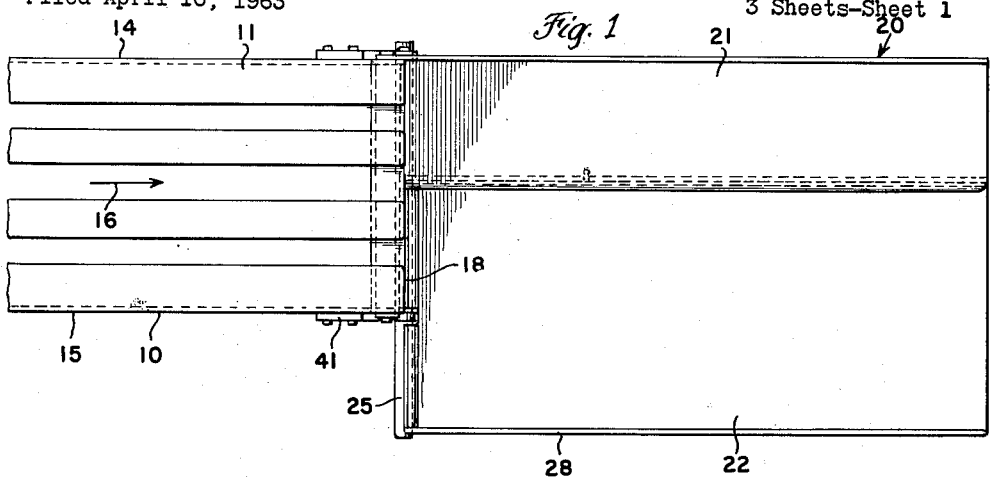
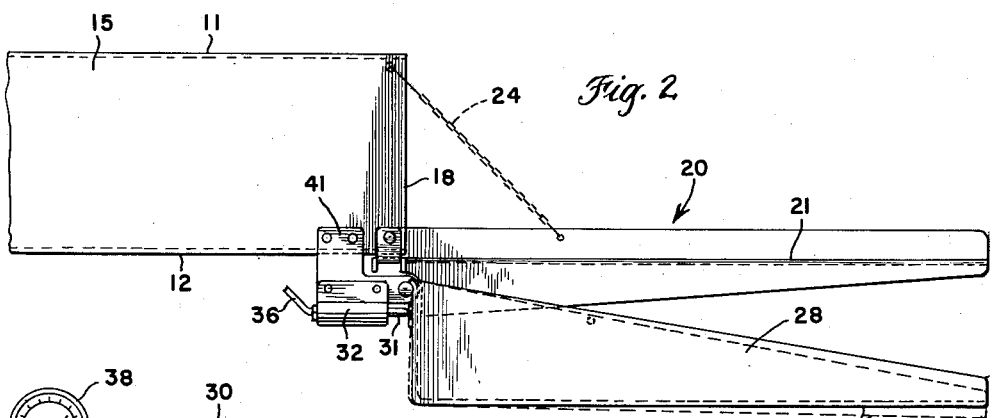
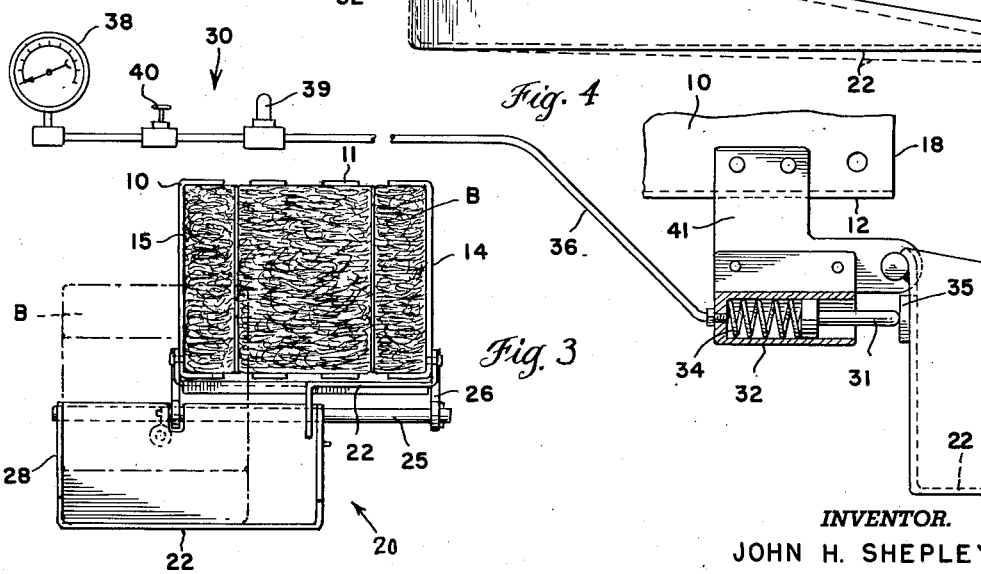
INVENTOR.
JOHN H. SHEPLEY
BY
*Joseph A. Brown*
ATTORNEY March 24, 1964  J. H. SHEPLEY  3,126,069
BALER ATTACHMENT
Filed April 16, 1963  3 Sheets-Sheet 2
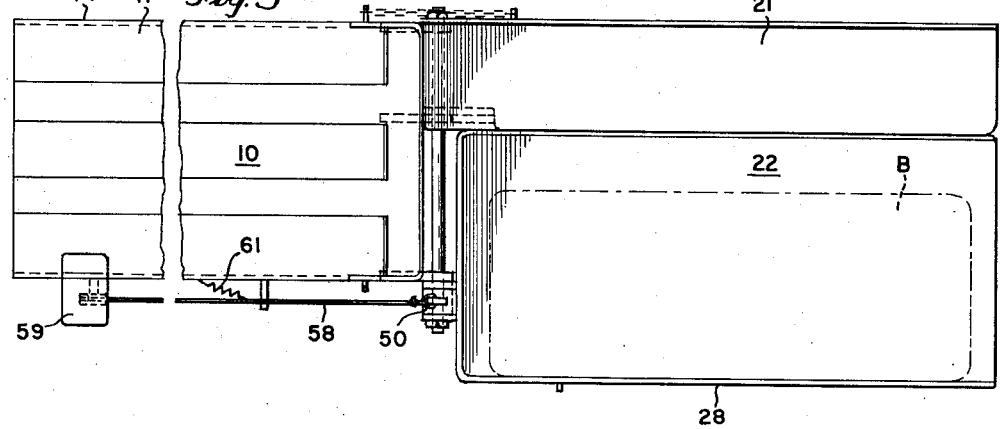
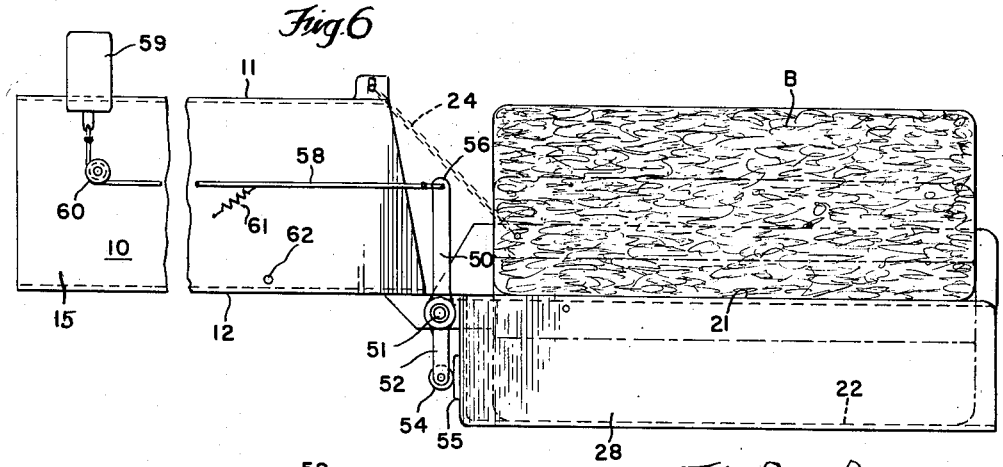
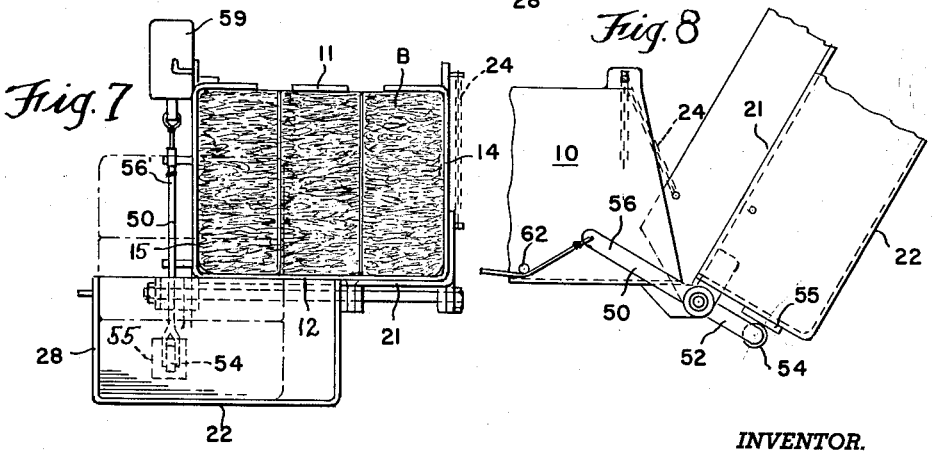
INVENTOR.
JOHN H. SHEPLEY
BY
ATTORNEY

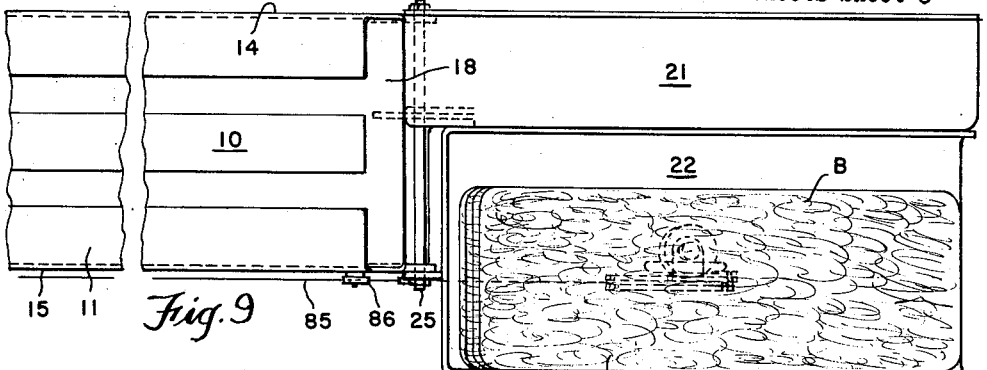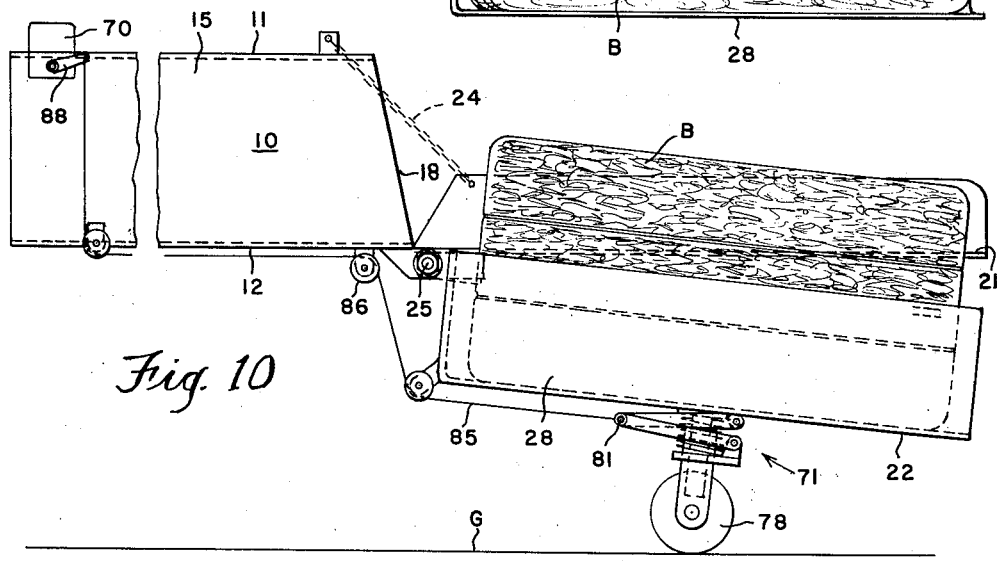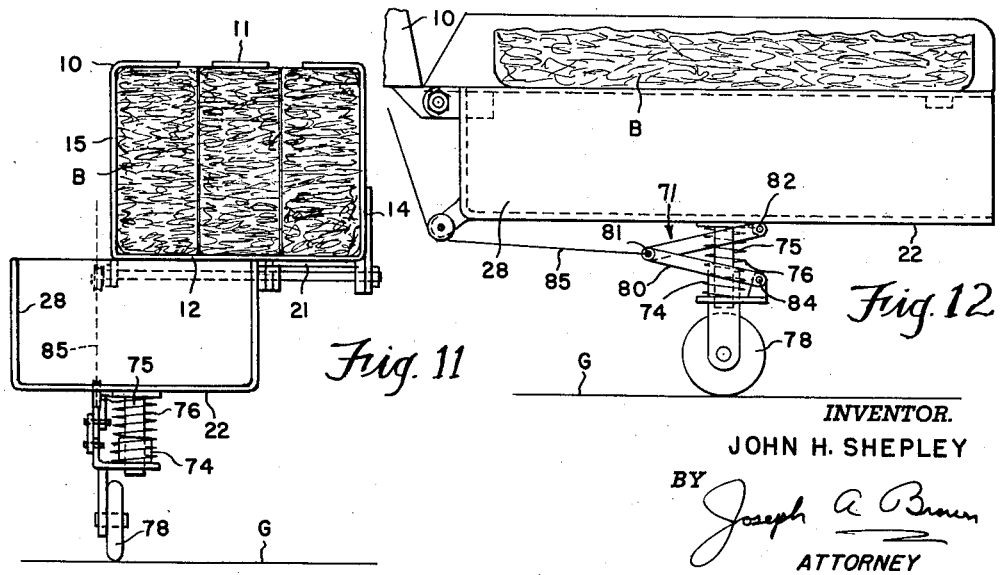

United States Patent Office 3,126,069
Patented Mar. 24, 1964

3,126,069
BALER ATTACHMENT
John H. Shepley, Lancaster, Pa., assignor to Sperry Rand Corporation, New Holland, Pa., a corporation of Delaware
Filed Apr. 16, 1963, Ser. No. 273,502
8 Claims. (Cl. 177—136)

This invention relates generally to bale weighing apparatus for hay balers and more particularly to apparatus including a bale weighing chute which will temporarily hold a bale before discharge so that the bale may be properly weighed.

To minimize handling and transportation problems, it is desirable to provide hay bales which are substantially uniform in size and weight. For this reason, bale weigher attachments have been provided for hay balers to receive bales and weigh them before the bales are deposited on the ground. A baler operator observes a weight indicator as each bale is deposited on a weighing device and he may adjust the density control means of the baler in response to weighing results. If the bales being discharged are below a desired weight, the operator can increase the density of the bales and thus their weight. If the bales being discharged are too heavy, he can release the bale tension and produce lighter bales.

High capacity hay balers commonly turn out six to eight bales per minute. Each bale is located on a bale weighing chute only a short time before it is discharged onto the ground. Therefore, the operator has only a short period of time to observe the weight results of a given bale. To obtain a proper reading, the particular bale to be weighed must be free and clear of the bale case and suported on the chute only. When so located, the next bale emerging from the bale case pushes the previously discharged bale from the bale chute. As the next bale emerges, its leading end also engages the bale chute and this tends to interfere with accurate bale weighing of the previously deposited bale. Therefore, having a bale in proper location a sufficient time to take a reading and to prevent the next bale to be discharged from interfering with the weighing operation presents the bale weighing devices presently available with substantial problems.

One object of this invention is to provide improved bale weighing apparatus so constructed that each discharged bale is held in weighing position for an adequate period of time to insure proper weighing results.

Another object of this invention is to provide bale weighing apparatus having a bale weighing chute wherein the bale on the chute is weighed completely independently of the next bale being discharged.

Another object of this invention is to provide bale weighing apparatus of the character described wherein a bale is discharged onto a fixed portion of a bale chute and then transferred therefrom to a movable portion where a bale weighing operation takes place.

A further object of this invention is to provide bale weighing apparatus of the character described which is equally adaptable for use in connection with hydraulic or mechanical means for indicating bale weights.

A still further object of this invention is to provide bale weighing apparatus of the character described which is relatively simply constructed whereby it may be manufactured and sold at low cost.

Other objects of this invention will be apparent hereinafter from the specification and from the recital in the appended claims.

In the drawings:

FIG. 1 is a fragmentary plan view of the discharge end of the bale case of a baler having mounted thereon bale weighing apparatus constructed according to this invention;

FIG. 2 is a side view of FIG. 1;

FIG. 3 is an end view looking from right to left of FIG. 2 and showing a bale emerging from the bale case in solid lines and discharged to a bale weighing position in dotted lines;

FIG. 4 is an enlarged generally diagrammatic side view showing the hydraulic weight indicating means forming part of the apparatus;

FIG. 5 is a plan view similar to FIG. 1 and showing bale weighing apparatus constructed according to another embodiment of this invention;

FIG. 6 is a side elevation of FIG. 5 and showing mechanically actuated means for indicating bale weights;

FIG. 7 is an end view looking from left to right of FIG. 6;

FIG. 8 is a fragmentary side view similar to FIG. 6 but showing the bale weighing apparatus retracted to inoperative, transport position;

FIG. 9 is a plan view similar to FIGS. 1 and 5 and showing bale weighing apparatus constructed according to still another embodiment of this invention;

FIG. 10 is a side elevation of FIG. 9 showing a bale being weighed and actuating a bale indicator by mechanical means interposed between the apparatus and the ground;

FIG. 11 is an end view looking from right to left of FIG. 10; and

FIG. 12 is a fragmentary side elevation similar to FIG. 10 and showing the bale chute in position to receive a discharged bale.

Referring now to the drawings by numerals of reference, and first to the embodiment of the invention shown in FIGS. 1-4, 10 denotes a bale case having a top wall 11, a bottom wall 12, and side walls 14 and 15. Hay bales B formed in the bale case 10 are progressively moved, in the direction indicated by the arrow 16 in FIG. 1, for discharge from the bale case. The bales are rectangular in shape and they are discharged through the rearward end 18 of bale case 10.

To receive each bale, weighing apparatus 20 is provided comprising a first horizontal chute section 21 and a second horizontal chute section 22. The chute sections extend parallel to each other and in the same direction as the extension of bale case 10. Chute section 21 is connected to the bale case as an extension of bottom wall 12 and located adjacent side wall 14, as shown best in FIGS. 1 and 3. Section 21 is held in a normal fixed position relative to bale case 10 by a chain 24.

While bale chute section 21 is normally located in a fixed position, the second bale chute section 22 is pivotal relative to bale case 10. A cross shaft 25 is supported on brackets 26 connected to the bale case. Shaft 25 pivotally supports chute section 22 for movemet from the solid line position shown in FIG. 2 to the dotted position. As shown in FIGS. 2 and 3, chute section 22 is located spaced below chute section 21. Chute section 21 is narrow in width and as bale B is discharged from bale case 10, it slides along the section. When free of bale case 10, the bale topples laterally onto the second chute section 22 for support thereon. An upright outside wall 28 is provided on section 22 to engage each bale and limit the tipover to one quarter turn or ninety degrees.

When the bale B is supported on second chute section 22, it extends upwardly and above the level of the first chute section 21. Further, a portion of the bale remains in the path of the next bale to be discharged from bale case 10. Thus, the next bale will engage and push the bale resting on chute section 22 along the chute for ultimate discharge on the ground.

When a bale is toppled onto the second chute section 22, such chute section pivots downwardly responsive to the weight of the bale as indicated in FIG. 2. Such pivoting movement provides the actuation of a bale weight indicator mechanism 30 including a piston 31 slidable in cylinder 32. A spring 34 continuously biases piston 31 in an outward direction and against a pad 35 carried on chute section 22. The force of spring 34 holds the chute in its normal, solid line position as shown in FIG. 2. When a bale is deposited on chute section 22, and the chute pivots downwardly, piston 31 is forced inwardly and spring 34 is compressed. Piston 31 is part of a hydraulic circuit including line 36 which extends to a weight indicator 38. Included in line 36 is a reservoir 39 and a flow control valve 40. The valve delays the flow of fluid away from indicator 38 when the bale being weighed is discharged onto the ground and piston 31 is free to return to starting position. This causes the indicator to dwell at its reading point to give the operator ample opportunity to observe the weight of a particular bale. This valve structure is conventional and may be adjusted by the operator to produce a desired dwell time. It is intended that the indicator 38 will be located at the forward end of a baler in close proximity to the operator on the tractor towing the baler. The cylinder 32 for the piston 31 is connected by a bracket 41 which is in turn suitably affixed to bale case 10.

With the structure described, each bale remains on chute section 22 for a sufficient time to enable the operator to conveniently note the weight of the bale. Since there is only one bale on chute section 22 at a time, the next emerging bale has no influence whatsoever on the weighing result. As the next bale is being discharged from the bale case, it is supported on the first chute section 21 and eliminated thereby from influencing the weighing result of previous bale. The emerging bale operates however to slide the previously deposited bale longitudinally of chute section 22 for deposit on the ground. With this structure consistent and accurate bale weighing results are obtained.

In the bale weighing apparatus shown in FIGS. 5-8, the chute arrangement is substantially the same as that shown in FIGS. 1-4. However, the bale weight indicator means is constructed differently. In these figures, the parts which are the same as equivalent parts in FIGS. 1-4 bear like numerals. The indicator structure comprises a lever 50 medially pivoted at 51 on bale case 10 and having a lower end 52 provided with a roller 54 engaging a pad 55 on the second chute section 22. When the second chute section pivots downwardly, after a bale has been deposited thereon, lever 50 pivots in a clockwise direction from the position shown in FIG. 6. Connected to the upper end 56 of the lever is a cable 58 which actuates a visual indicator 59. Cable 58 extends around a guide pulley 60 carried on bale case 10 and the cable is continuously biased in a direction toward indicator 59 by a spring 61. In this way, lever 50 is biased in a counterclockwise direction whereby the roller 54 is held in engagement with the pad 55 to hold the second chute section in the normal solid line position.

As with the structure shown in the first embodiment of the invention, the lever 50 provides a weight indicating result when the bale is deposited on chute section 22. Downward pivoting movement of section 22 is utilized to produce the weight indication. Chute section 21 holds the next bale being discharged out of engagement with the second chute section and prevents any interference with the weighing operation. As shown in FIG. 8, the bale chute structure is particularly adapted to be lifted upwardly to an inoperative position when not in use. Lever 50 is free to swing relative to the bale case 10. Since such movement of the lever to inoperative position will place slack in the cable 58, a pin 62 is provided around which the cable is adapted to be extended. When the parts are placed in a position shown in FIG. 8 the spring 61 must be disconnected from the cable to allow this movement.

In FIGS. 9-12, a weight indicator is shown at 70 and actuated by scissor means 71 interposed between chute section 22 and the ground denoted G. Chute section 22 is supported by a pair of telescopic members 74 and 75 which are extendable and contractable, being however normally held in extended position by a spring 76. Beneath the telescopic member 74 is a ground wheel 78. A pair of lever arms 80 are arranged as shown and pivotally connected at 81. One member is pivotally connected at 82 to the upper telescopic member 75 while the other member is connected at 84 to the lower telescopic member 74. When spring 76 is compressed by the weight of a bale on the chute section 22, FIG. 10, the point 81 is shifted relative to the chute section and such scissor movement is used to actuate a control cable 85 extending to indicator 70. Suitable guide pulleys 86 are provided for proper extension of the cable to a control lever 88 on the indicator 70. Although not shown, lever 88 is spring biased to a normal position wherein the cable 85 is pulled tight. The lever is pulled downwardly when the pivot point 81 is in the position shown in FIG. 12. However, when a bale is being weighed on chute section 22, cable 85 is released and the lever 88 is adapted to pivot to provide an indication of bale weight.

It will be seen therefore that with the three embodiments of the invention disclosed, accurate bale weighing is obtainable without interference from the next bale being discharged from the bale case. The structure lends itself to various mechanical arrangements for giving bale weight indications or to hydraulic structures. The actuation of the weight indicators may be directly from the chute section 22 or it may be obtained indirectly through means such as shown by the scissor mechanism in FIGS. 9-12.

While this invention has been described in connection with three embodiments thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. Bale weighing apparatus attachable to the bale case of a baler to receive bales progressively discharged therefrom and hold each bale temporarily so that each bale may be weighed before being deposited onto the ground, comprising a first chute section and a second chute section extending generally parallel to each other and in different horizontal planes, means connecting said first section to said bale case as an extension thereof and along one side of the bale case, means pivotally connecting said second section to said bale case along the opposite side thereof and spaced below said first section, said first section being of such narrow width that each bale on being deposited thereon free of the bale case topples laterally onto said second section for support thereby, said second section pivoting relative to said bale case responsive to the weight of a bale thereon, weight indicator means, means connecting said weight indicator means to said second section and actuated responsive to pivoting of the second section, each bale when supported on said second section projecting above said first section and in the path of the next bale to be discharged from the bale case whereby the next bale progressively pushes the bale on said second section longitudinally for discharge rearwardly onto the ground.

2. Bale weighing apparatus as recited in claim 1 wherein said connecting means comprises a piston movable responsive to pivoting of said second chute section, spring means yieldably holding said piston in a normal position, and a hydraulic linkage between said piston and said weight indicator means.

3. Bale weighing apparatus as recited in claim 2 wherein said hydraulic linkage includes valve means to regulate to actuation of said indicator means.

4. Bale weighing apparatus as recited in claim 1 wherein said connecting means comprises a pivoted lever engaging said second chute section and pivotal responsive to pivoting thereof, a mechanical linkage between said lever and said weight indicator means, and spring means yieldably holding said piston in a normal position.

5. Bale weighing apparatus as recited in claim 4 wherein said lever and said second chute section are pivotal relative to said bale case about a common axis transverse to the direction of discharge of bales from the bale case.

6. Bale weighing apparatus attachable to the bale case of a baler to receive bales progressively discharged therefrom and hold each bale temporarily so that each bale may be weighed before being deposited onto the ground, comprising a first chute section and a second chute section extending generally parallel to each other and in different horizontal planes, means connecting said first section to said bale case as an extension thereof and along one side of the bale case, means pivotally connecting said second section to said bale case along the opposite side thereof and spaced below said first section, said first section being of such narrow width that each bale on being deposited thereon free of the bale case topples laterally onto said second section for support thereby, said second section pivoting relative to said bale case responsive to the weight of a bale thereon, a ground wheel beneath said second section, a compression spring means connecting said wheel to said second section and yieldably holding the second section in a normal position, weight indicator means, means responsive to compression of said spring on pivoting of said second section for actuating said weight indicator means, each bale when supported on said second section projecting above said first section and in the path of the next bale to be discharged from the bale case whereby the next bale progressively pushes the bale on said second section longitudinally for discharge rearwardly onto the ground.

7. Bale weighing apparatus as recited in claim 6 wherein telescopic means connects said second chute section to said wheel and extendable and contractible responsive to compression and expansion of said spring.

8. Bale weighing apparatus as recited in claim 7 wherein said actuating means comprises a mechanical linkage operated responsive to extension and contraction of said telescopic means.

No references cited.